US010183742B2

(12) United States Patent
Carreker

(10) Patent No.: US 10,183,742 B2
(45) Date of Patent: Jan. 22, 2019

(54) DIRECT ORIENTATION VECTOR ROTOR

(71) Applicant: Raymond George Carreker, Denver, CO (US)

(72) Inventor: Raymond George Carreker, Denver, CO (US)

( * ) Notice: Subject to any disclaimer, the term of this patent is extended or adjusted under 35 U.S.C. 154(b) by 440 days.

(21) Appl. No.: 14/875,971

(22) Filed: Oct. 6, 2015

(65) Prior Publication Data
US 2016/0023756 A1 Jan. 28, 2016

Related U.S. Application Data

(63) Continuation of application No. 13/715,006, filed on Dec. 14, 2012, now Pat. No. 9,193,452.

(51) Int. Cl.
*B64C 27/52* (2006.01)
*B64C 27/28* (2006.01)
*F16D 3/18* (2006.01)
*B63H 5/125* (2006.01)

(52) U.S. Cl.
CPC .............. *B64C 27/52* (2013.01); *B64C 27/28* (2013.01); *B63H 5/125* (2013.01); *F16D 3/18* (2013.01); *F16D 3/185* (2013.01)

(58) Field of Classification Search
CPC ........ G05D 1/0858; B64C 27/28; B64C 27/52
USPC .............................................. 89/41.02, 41.21
See application file for complete search history.

(56) References Cited

U.S. PATENT DOCUMENTS

| 6,676,073 B2 * | 1/2004 | Thomassey ............. B64C 27/28 244/53 R |
| 2003/0071167 A1 | 4/2003 | Thomassey |
| 2004/0133381 A1 * | 7/2004 | Chen ........................ G01C 9/00 702/153 |
| 2010/0226742 A1 | 9/2010 | Ladd |

FOREIGN PATENT DOCUMENTS

WO 2006075096 A1 7/2006

* cited by examiner

*Primary Examiner* — Nicholas McFall
(74) *Attorney, Agent, or Firm* — Cozen O'Connor

(57) ABSTRACT

A direct orientation vector rotor (DOVER) for use on rotary wing aircraft includes a gear set for multidirectional rotor orientation based on the spherical coordinate system; an inclination mechanism, wherein the rotor is moved from the 0° horizontal position to an inclined position; a rotational turret, wherein the rotor is moved along the azimuth and wherein the inclination mechanism is housed; and a motion-adapted gear lubrication housing.

18 Claims, 15 Drawing Sheets

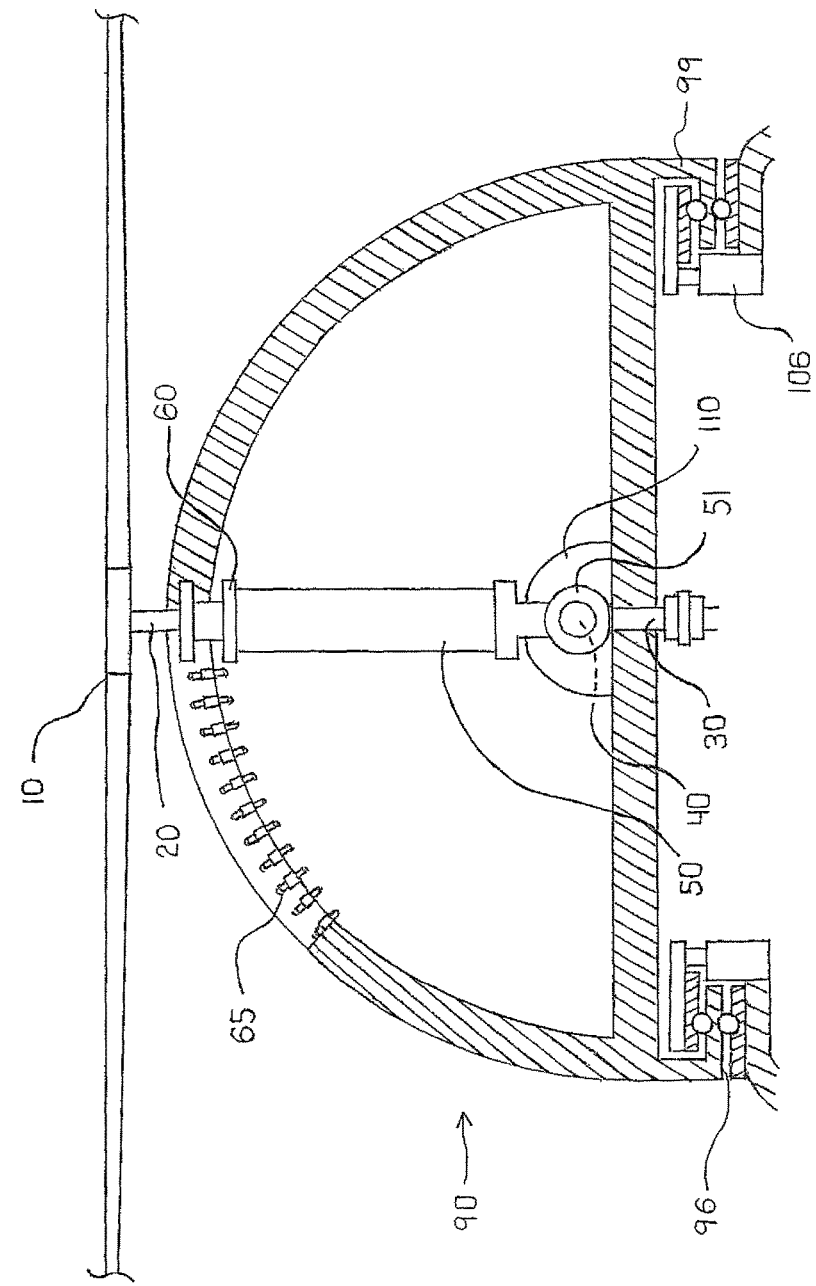

Fig. 7
Fig. 8
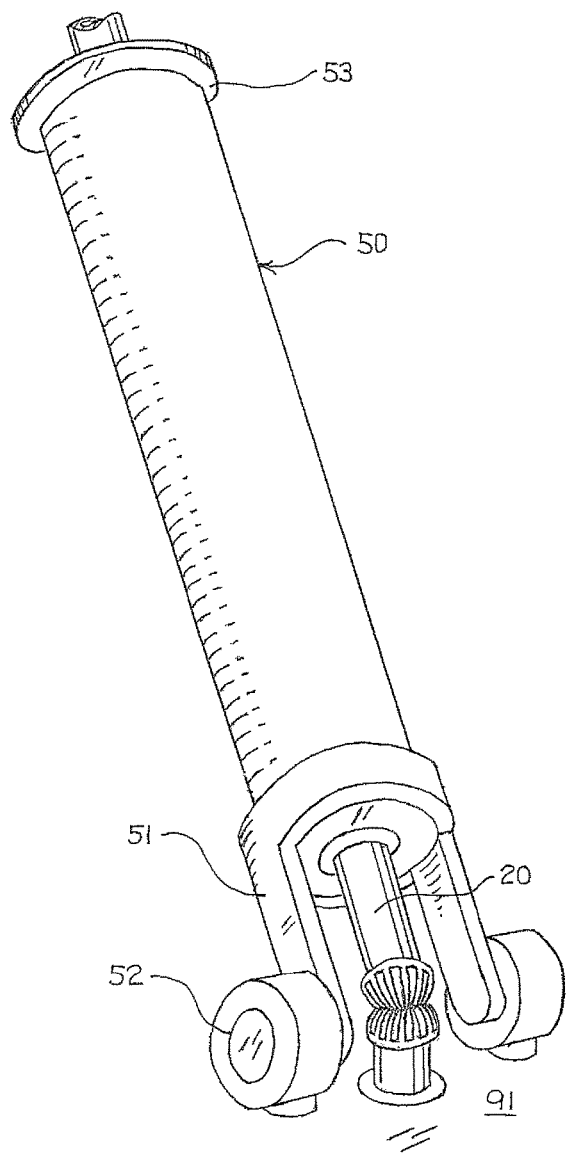
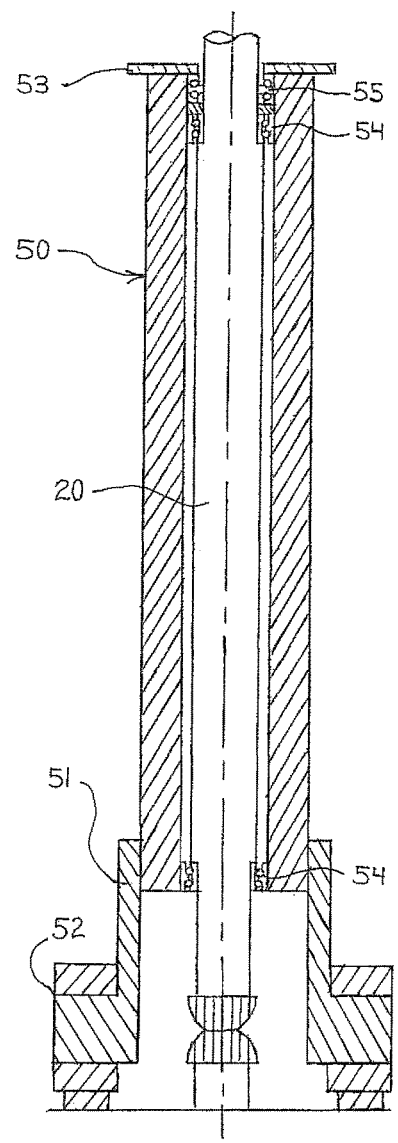

DIRECT ORIENTATION VECTOR ROTOR

CROSS-REFERENCE TO RELATED APPLICATIONS

This application is a continuation of U.S. nonprovisional application Ser. No. 13/715,006, filed Dec. 14, 2012.

BACKGROUND

Embodiments of the DOVER relate to apparatuses used by the aerospace industry. More specifically, embodiments of the DOVER relate to the operation of rotary wing aircraft.

DESCRIPTION OF THE RELATED ART

Any discussion of the prior art throughout the specification should in no way be considered an admission that such art is widely known or forms part of common knowledge in the field.

The rotary wing aircraft, and more specifically the helicopter, is generally known as a utility vehicle distinguished by its ability to hover, fly vertically, and fly in various directions regardless of azimuthal orientation. Helicopters achieve directional flight by converting the vertical lift component produced by the rotating blades into a horizontal thrust component by changing the pitch of each individual blade as it revolves in its orbit around the hub onto which it is attached. The collective blade assembly or rotor disk consequently is tilted into a vector called the tip path plane by conveyed gyroscopic rotation which then determines the direction of flight. An inherent instability is manifest within the rotor blades because they are manipulated from the fixed axis of the hub, with said instability ultimately being transferred to the flight dynamics of the aircraft. Since the tip path plane remains relatively parallel to the relative wind (also called the relative air flow), the rotating blades exhibit drastic lift variance as they advance and retreat within the relative wind thereby causing an unbalanced relative flow of air passing over the rotor disk during flight. This uneven allocation of airflow over the total rotor disk produces a dissymmetry of lift leading to a decrease in total lift and a possible stall, a condition that is amplified at higher air speeds and which subsequently limits the potential flight speed obtainable. As a means to mitigate the effect of inadequate relative air flow and quickly build up airspeed, a pilot will routinely take off in a nose down attitude in an effort to obtain maximum thrust from the rotor disk by angling it more directly into the relative wind, thereby increasing the flow of air over the rotor disk and decreasing the dissymmetry of lift. With increasing airspeed however, the fuselage must be leveled to decrease induced drag. The ability of a pilot to position the rotor disk more directly into the relative wind for the duration of directional flight while maintaining the fuselage in a horizontal flight attitude would be a major advancement in rotary wing technology. Embodiments of the Direct Orientation Vector Rotor (DOVER) allow a more direct angling of the rotor disk into the relative wind throughout all directional flight maneuvers resulting in greater vehicle speed, maneuverability, stability, and flight safety, as well as manipulative control of rotor disk orientation during slope and obstacle-laden landings.

BRIEF SUMMARY

In one embodiment, a DOVER includes an articulated rigid mast assembly by which the rotor can be pointed at a more oblique angle into the relative wind than permitted by the prior art resulting in a system in which the motion is translational in the direction of the driving force. The complex mechanism for cyclic pitch control of the rotor blades of the prior art can be dispensed with in one embodiment allowing for a simpler and more lightly configured rotor, while retaining the flapping and lead-lag attributes of the prior art. Since the problem of retreating blade stall is largely reduced or eliminated, shorter blades and faster rotor speeds are possible allowing the DOVER to combine the function and utility of the helicopter rotor with the speed and reliability of the propeller of a fixed-wing or tilt-rotor aircraft, possibly leading the path toward the implementation of supersonic blade tip technology. In contrast to the tilt-rotor prior art which involves the cumbersome rotation of the total drive train in a slow inline arc, the DOVER allows the engine and transmission to remain in situ while the rotor and attached driven shaft or mast can freely and rapidly translate in any orientation required to control the aircraft thereby retaining the utility for which the rotorcraft is designed. In one embodiment, the articulated rigid mast assembly is actuated by a ball-face spline-tooth gear coupling, one as component of the drive train and the other as component to the driven rotor slave. In another embodiment, the output gear is in mesh with the input gear as the former is able to rotate, pivot, and swivel with respect to the latter thereby shifting the load contact area or active profile. In another embodiment, an inclination apparatus consists of a hingeably attached sleeve which sets the orientation of the rotor mast whereby said sleeve is levered along an inclination traverse being connected at arc perimeter to a thrust and vibration conductor that is powered along said inclination traverse on a transfer track by a linear motion actuator. In yet another embodiment, the inclination mechanism is housed within a turret which serves as a mass damper housing for said mechanism while allowing rapid 360° azimuth rotation of the total mechanism by way of a thrust bearing-configured ring unit that ultimately supports the in-flight mass of the aircraft. In another embodiment, the gear mesh is lubricated by a closed motion-adapted spray system. The apparatus described herein embodies a method of point-origin vector divergence thrust for controlled flight.

BRIEF DESCRIPTION OF THE DRAWINGS

FIG. 2 is a side cut away perspective view of one embodiment of the DOVER apparatus.

FIG. 7 is a perspective view of the mast control sleeve.

FIG. 8 is a cross-sectional view of the mast control sleeve.

DETAILED DESCRIPTION

Figure 1:
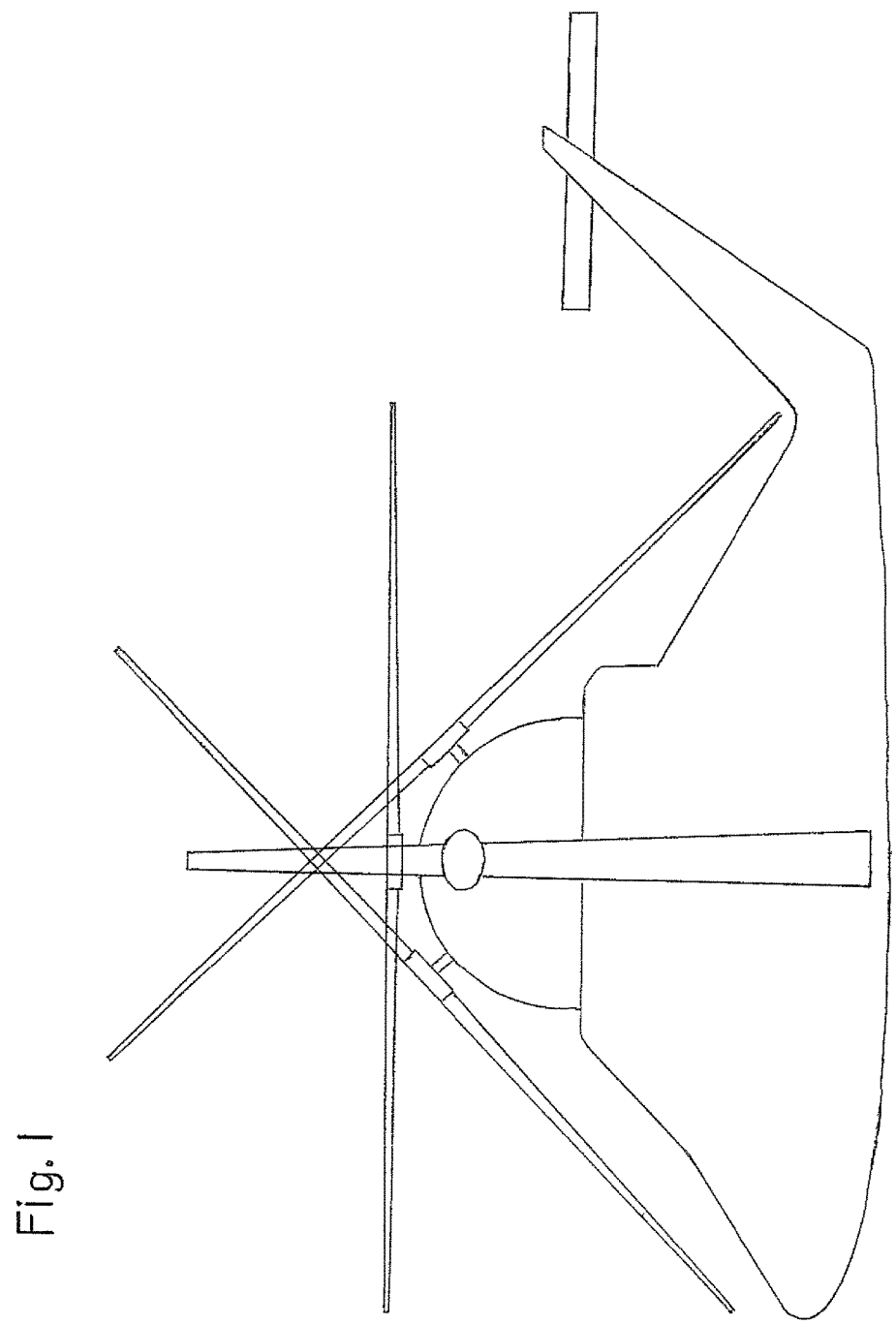
FIG. 1 is a side perspective view of one embodiment of the DOVER showing one possible inclination and azimuth range of movement.

Overview:

In FIG. 1, a DOVER system is shown displaying a 360° freedom of movement of operation of the rotor as delineated by an inclination of 45° at forward, aft, and lateral positions from the horizontal on a traditional tail rotor design helicopter, although the DOVER also is applicable to fenestron shrouded tail rotor and No Tail Rotor (NOTAR) blown-air designs. The inclination/azimuth traverse mechanical operation controlled by the automatic flight control system (AFCS) can be programmed to avoid obstruction of the rotor blades by the standard helicopter boom configuration by a function that automatically decreases the inclination as the 180° azimuth boom location is approached during azimuth rotation traverse and thereby causing the rotor to pass over the boom. In FIG. 2, embodiments of the DOVER apparatus consist of a rotor 10 attached to a driven mast 20 which is in rotational lock with the transmission drive shaft 30 by the meshing of the gears 40 (ensconced) where the driven mast 20 is enclosed within and supported by a hingeably attached sleeve 50 that abuts a thrust and vibration conductor 60 which is interlocked with and actuated along an inclination traverse on a transfer track 65 that constitutes a curvilinear guide along the inner surface of the rotating turret 90 which secures the sleeve 50 at the pivot hinge 51. The turret 90 actuates azimuth rotation along the turret ring 96 that interfaces with the aircraft fuselage at the base 99 which forms part of the turret/fuselage ring unit that is maintained in the assembly by an array of pressure actuators 106. The gears 40 are enclosed within a motion-adapted lubrication housing 110.

Figure 4:
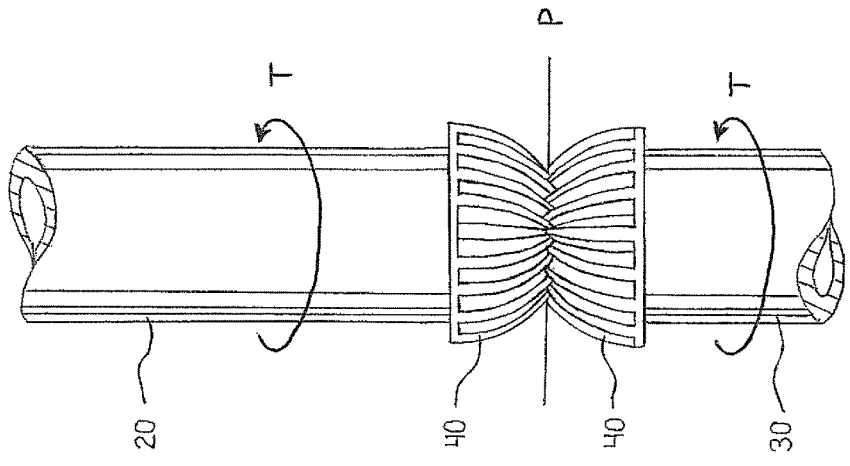
FIG. 4 is a perspective view of two ball-face spline-tooth gears in rotational mesh at 0° inclination.
Figure 3A:
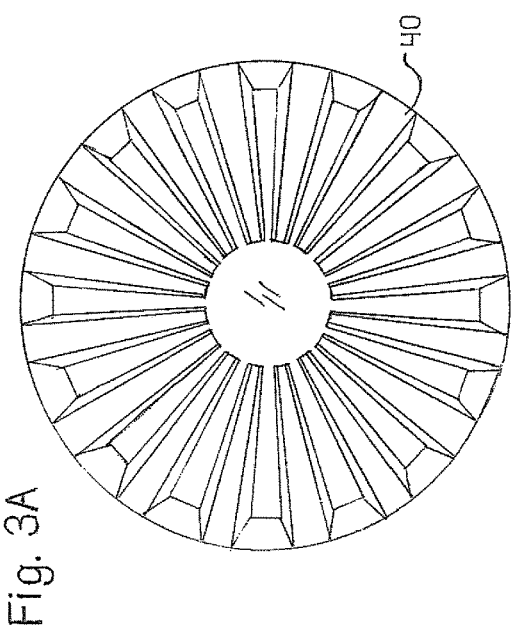
FIGS. 3a and b respectively show top and side perspective views of the ball-face spline-tooth gear.
Figure 3B:
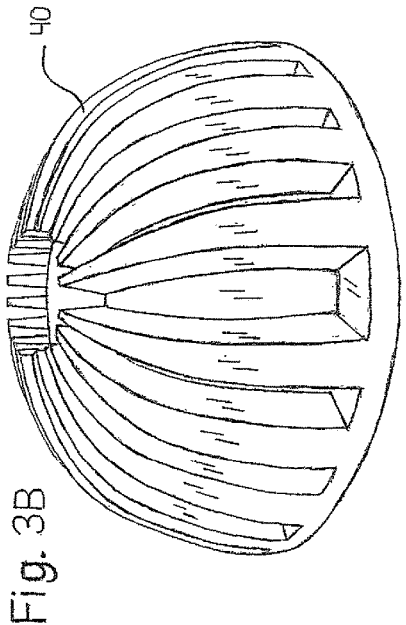
Figure 5:
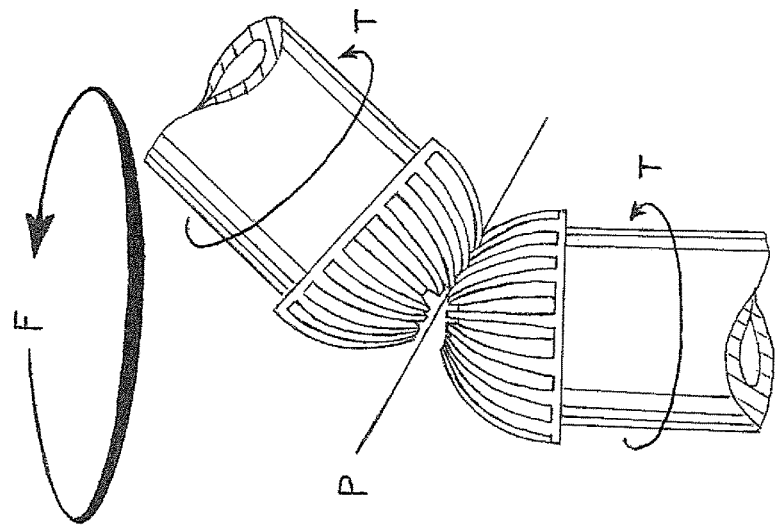
FIG. 5 is a perspective view of two ball-face spline-tooth gears in rotational mesh with the inclination motion illustrated.
Figure 6:
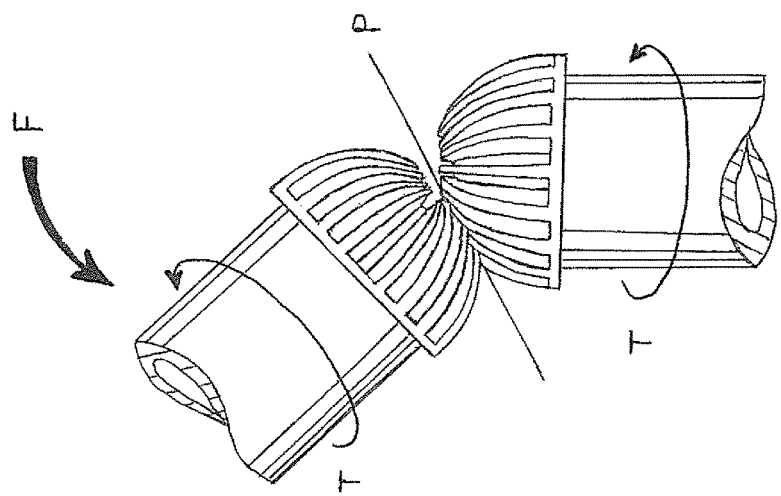
FIG. 6 is a perspective view of two ball-face spline-tooth gears in rotational mesh with the azimuthal motion illustrated.

Articulated Mast Gears:

The articulated rigid mast assembly is an embodiment of the DOVER that is constituted by the rotational union of the rotor mast 20 with the drive shaft 30 by the joining of the ball-face spline-tooth gears 40 in a 1-to-1 tooth ratio conjugate-action mesh with high geometric conformity of the mating surfaces which produces a coaxial torque allowing operation within a curved plane paradigm. The two gears 40 are of a mirroring placement configuration containing the functional elements of a hemispherical dome face profile hub, with opposing end keyed to the shaft, with the face consisting of an axial set of teeth embodied by straight or helical longitudinally configured alternating splines and spaces where the chordal spline thickness approximates the adjoining space laterally along the length of said splines and spaces which decrease in width from the face edge to near the face apex where the splines and spaces terminate before convergence. A generalized schematic of a straight-spline embodiment of the described ball-face spline-tooth gear 40 is shown in FIGS. 3a and b. The gears 40 can embody various tooth and space profiles including, but not limited to, involute curves and circular arc curves as well as various numeric schemes of said teeth and spaces. Any alternate profiles configured into the tooth pattern are considered within the embodiments of the DOVER. As a gear is engaged in the rolling action, the tooth structure undergoes a plastic deformation (bending) within the material due to compressive and tensile stresses, and experiences surface fatigue as a result of torsional vibrations (chatter) inherent in mechanical operations. It is posited herein that the ball-face spline-tooth gear design provides within its specialized configuration the means to effectively conduct and distribute stress loads along the elongated tooth profile in a mode conducive to its innovative function. When the two gears 40 are meshed (FIG. 4), torque T is transferred from the drive shaft 30 to the driven mast 20. In this configuration, the gears 40 are coincident with the common plane P of rotation described by the meshed faces of said gears within an in-line or 0° combined angle of the gears. In this configuration, conducive with a hover or vertical flight, the load pattern is applied at the apex ends of the gear teeth, assuming a circular shape whereby the total sum of teeth simultaneously contribute to load bearing. When a lever induces a curvilinear force F across the extant angular motion of the driven mast 20 in a vector perpendicular to the transverse axis and common pitch plane P of the meshed faces, torque in the driven mast 20 is translated in concert with the imposed variable vector via the mesh and moves in parallel with the now mobile and angled pitch plane P where said plane reflects the union of mesh or active profile between the driven gear 40 and the drive gear 40 (FIG. 5). In effect, the rotating driven gear 40 face spatially rolls longitudinally (accompanied by a lateral sliding) down the spatially stationary rotating drive gear 40 face in synchromesh with the common lash of the splines and spaces as the driven mast 20 pivots with respect to the drive shaft 30. In this configuration, conducive of directed flight, the load pattern is shifted down the face of the gears in the direction of the face edge, assuming an elliptical shape and load bearing area across the profile of the gear face. Although fewer teeth are engaged here at any one instant compared to the configuration illustrated in FIG. 4, the teeth that are engaged become meshed at a wider tooth cross section along their length where higher load demands become extant. This automatic configurational match to the increased load of high speed directed flight where a more oblique rotor angle is required is an embodiment of the ball-face spline-tooth gear 40. When an additional curvilinear force F is applied in a vector parallel to the original transverse axis, the angled pitch plane P will rotate along a track parallel to the transverse axial plane of the drive gear 40 (FIG. 6). In effect, the pivoted rotating driven gear 40 swivels (specifically, a sliding roll) laterally across the rotating face of the drive gear 40 causing the driven mast 20 to swing with respect to the drive shaft 30. As the application of these two force F motions (i.e., rolling pivot and lateral swivel) can coincide, the driven gear 40 also can translate diagonally across the drive gear 40 as a sum of the two concurrent force F motions (diagonal traverse) (not shown). As such, the drive gear 40 can be seen as a rotational template upon which the driven gear 40 is used to seek spherical coordinates that are manifest in the inclination and azimuth position of the driven mast 20. This method of active profile translation or simultaneous and multidirectional motion of the driven gear 40 and the associated load pattern across the curved surface of the drive gear 40 and resultant movement of the driven mast 20 is an embodiment specific to the ball-face spline-tooth gear 40 which allows the driven or output mast 20 to occupy an infinite number of positions within a cone-shaped parameter delineated by the maximum inclination of the applied perpendicular curvilinear vector acting upon said mast 20. The applied result, whereby torque from a two-dimensional spherical coordinate system (i.e., the gear-synchronized alignment intersection of coordinate axes) is freely directed (diverged) in a linear configuration into three-dimensional space, is herein termed point-origin vector divergence rotor thrust. When a rotor head is positioned onto the working end of the mast 20 it will reflect the freedom of movement inherent in the mast. In this embodiment, the curved two-dimensional plane of the gear 40 template is translated to the three-dimensionality of thrust or lift due to the incorporation of the thrust vector provided by the rotor 10.

Figure 9:
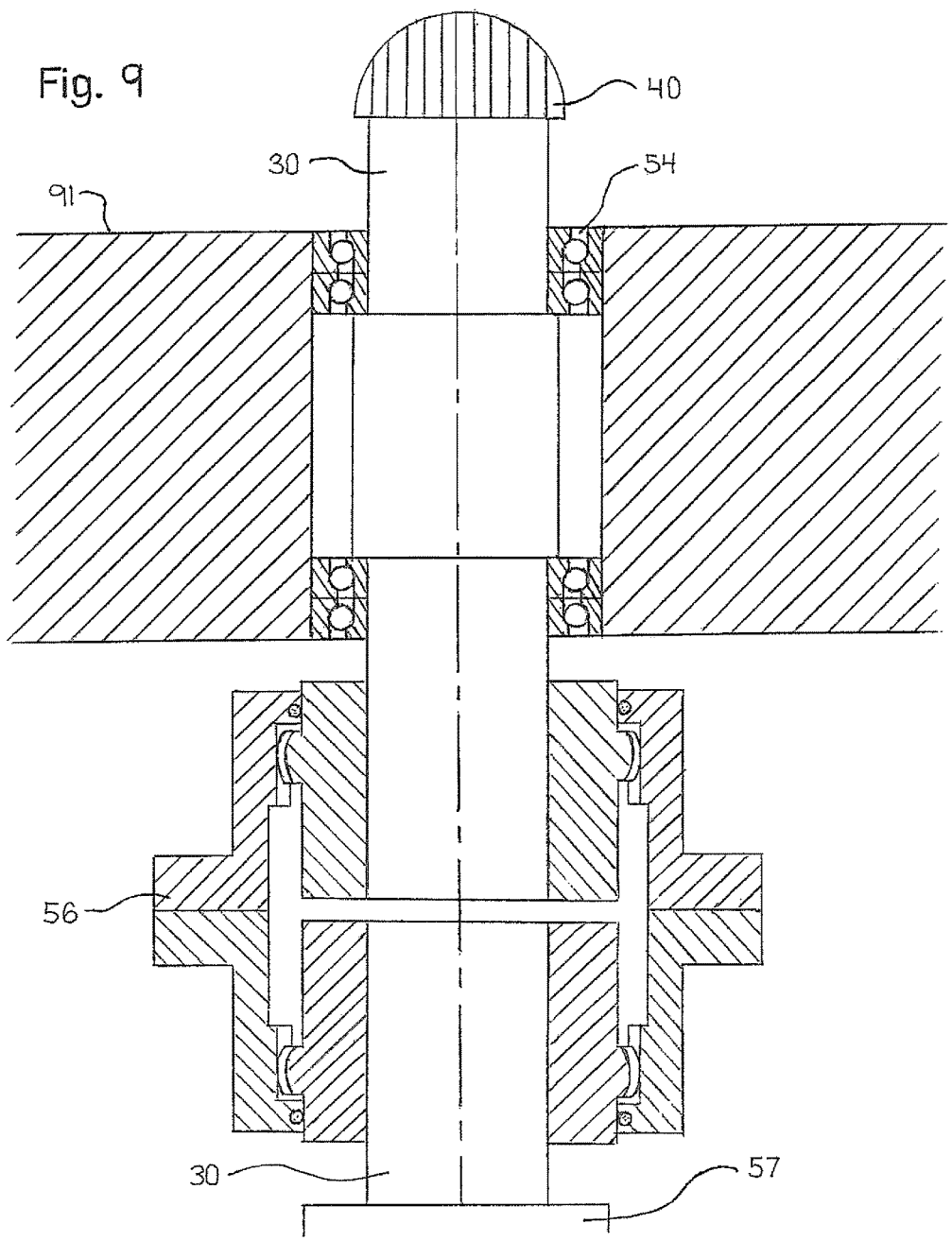
FIG. 9 is a cross-sectional view of the transmission drive shaft.
Figure 11:
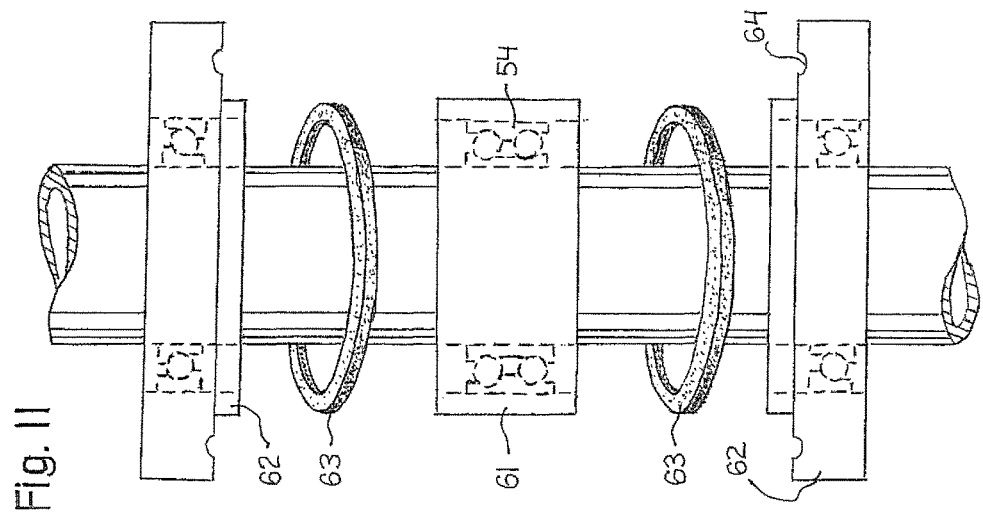
FIG. 11 is an exploded view of the thrust and vibration conductor.
Figure 10:
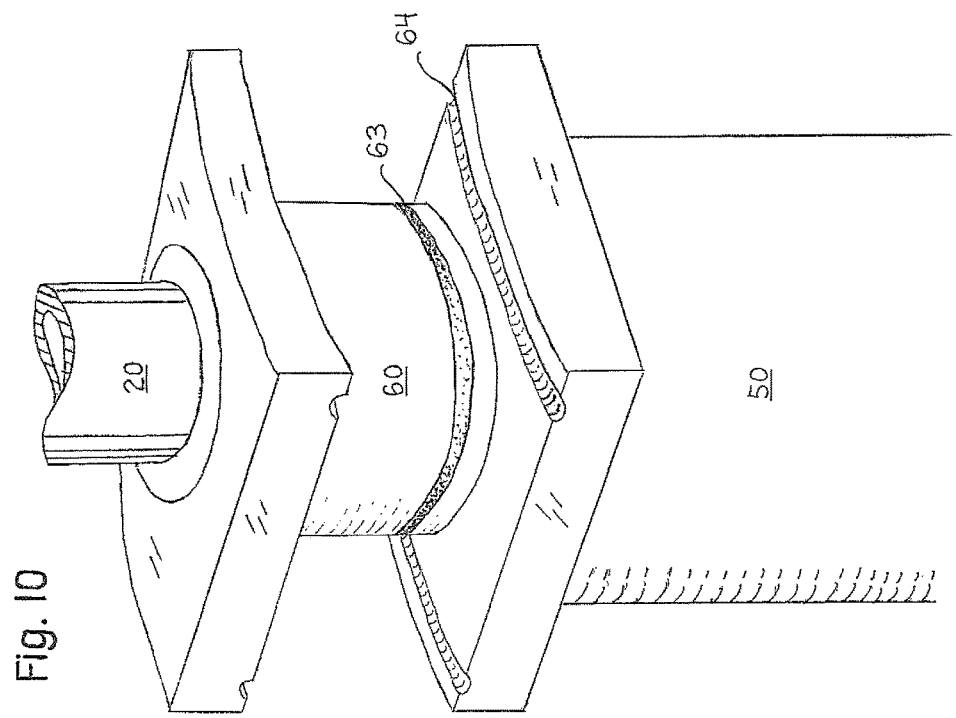
FIG. 10 is a perspective view of the thrust and vibration conductor.
Figure 12:
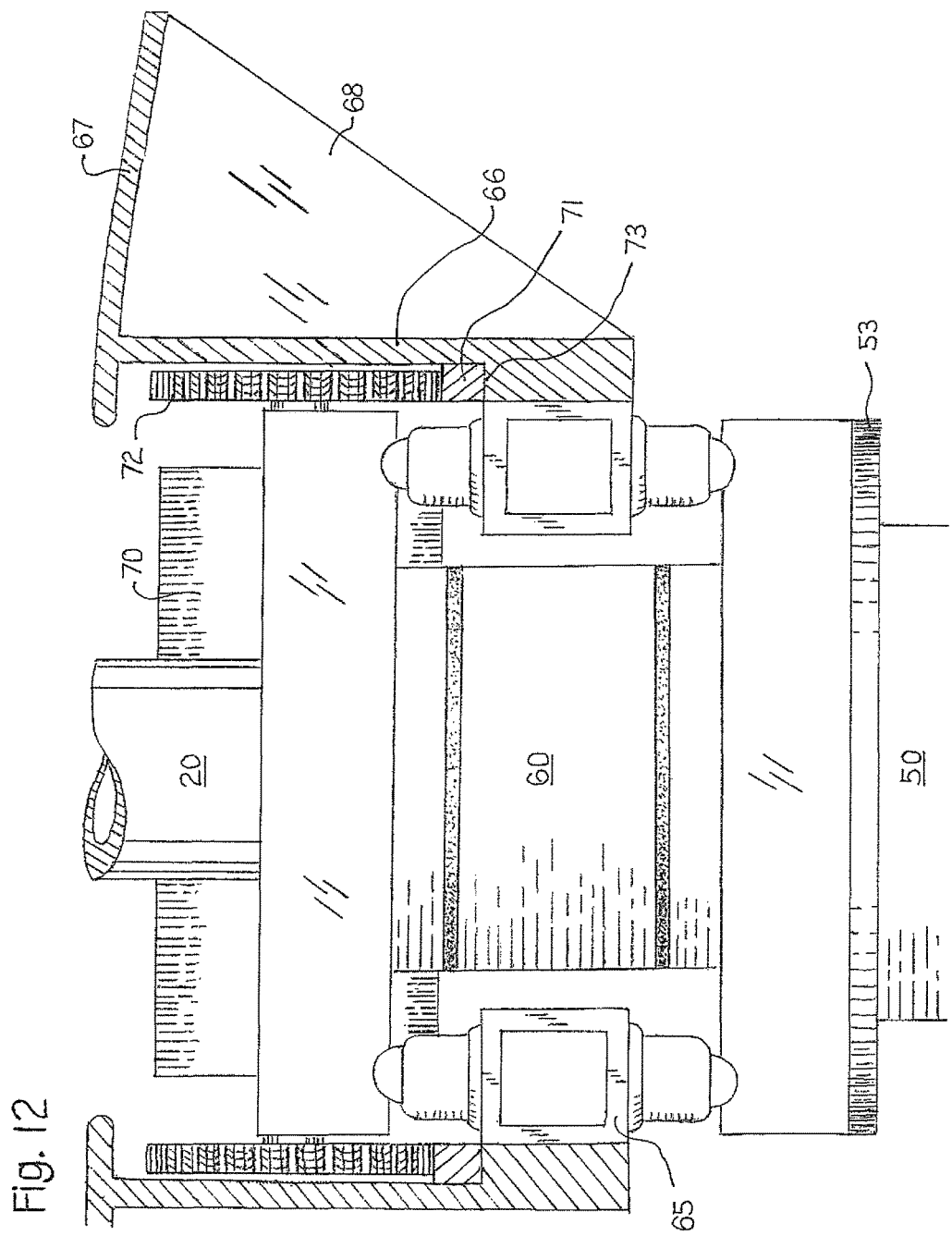
FIG. 12 is a front perspective view of the inclination mechanism.
Figure 13:
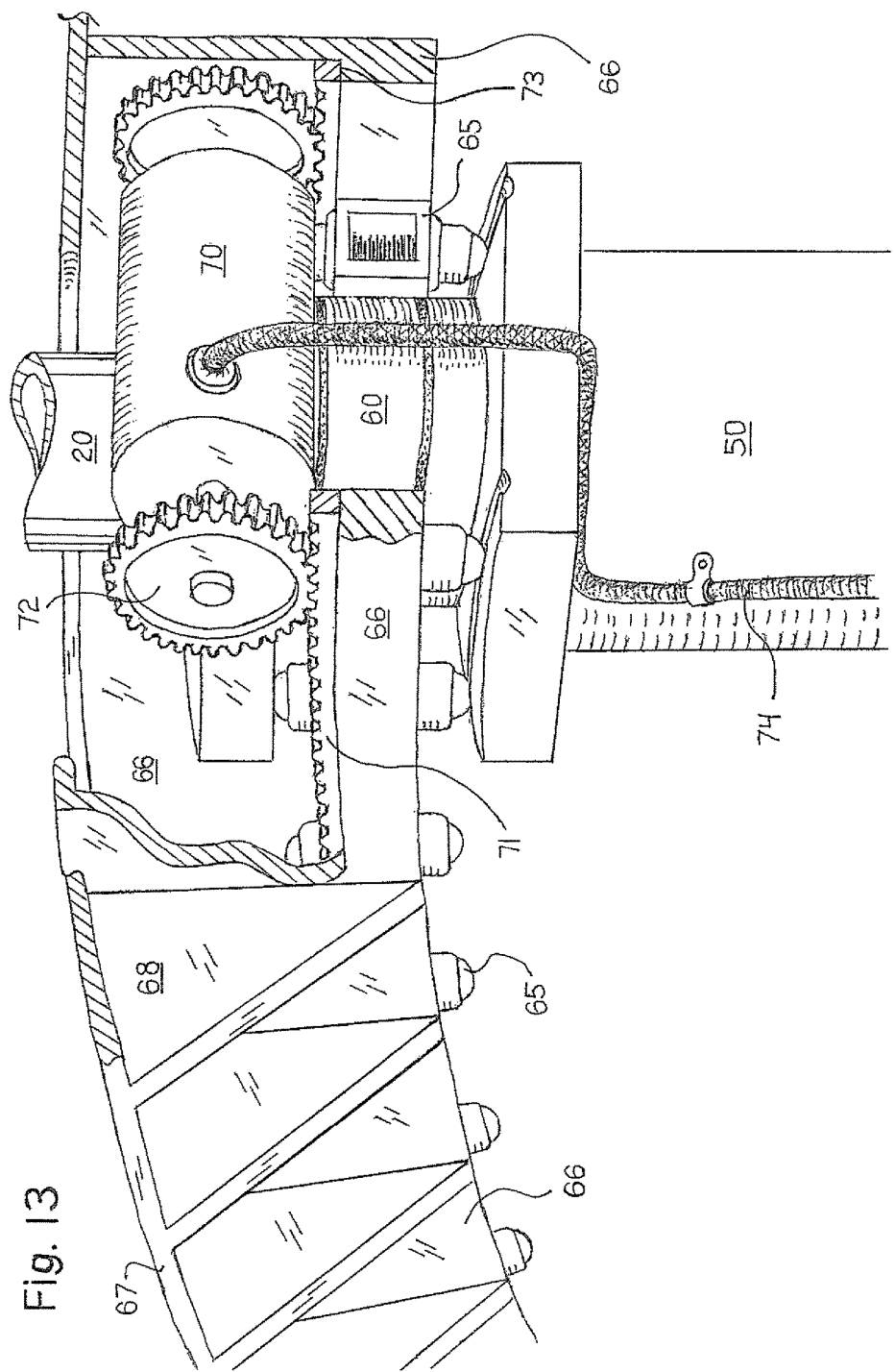
FIG. 13 is a cut away rear view of the inclination mechanism.
Figure 14:
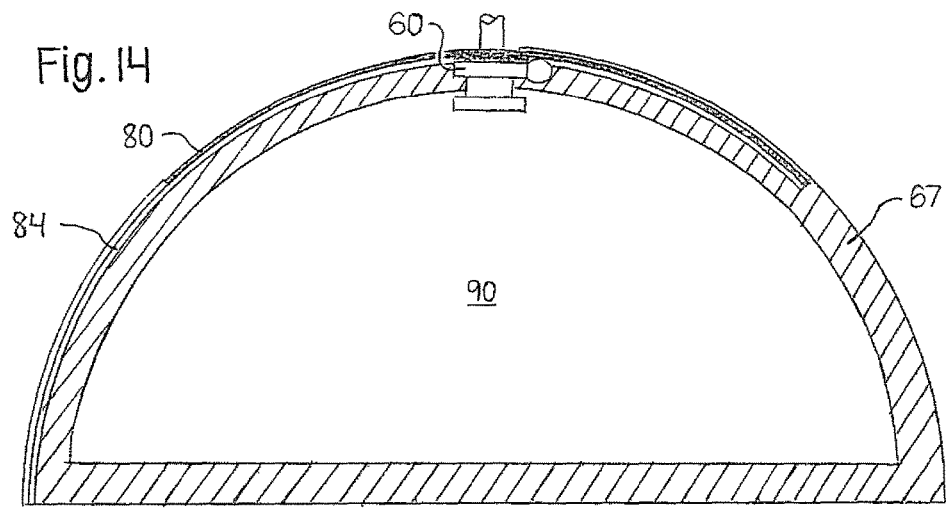
FIG. 14 is a cut away view showing the inclination traverse slide.
Figure 15:
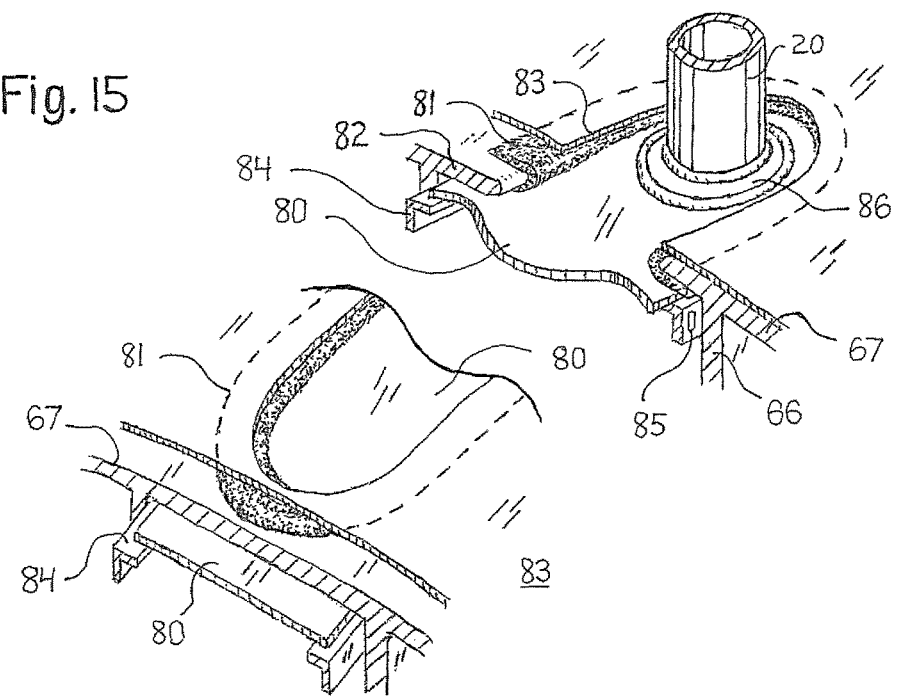
FIG. 15 is a perspective view of the inclination traverse slide.

Inclination Control Mechanism:

When two rotating shafts are to be connected, it is unavoidable that there will be some degree of misalignment, either because of static effects such as deflection of the shafts, thermal effects causing expansion and contraction, or dynamic loads causing the shafts to change position in their supporting bearings. Embodiments of the DOVER are herein presented to substantially mitigate shaft misalignment. The curvilinear force imposed upon the mast 20 described in the previous section is accomplished by an inclination mechanism embodied by a mast control sleeve 50, a thrust and vibration conductor 60, a transfer track 65, and an actuator 70 whereby the curvilinear action along the arc perimeter of the turret dome 92 mirrors and projects the ball profile of the gear 40 face. In FIG. 7, the mast control sleeve 50 specifically provides a structural rigidity in an inclined parametric mode, thereby allowing an articulated, synchromeshed functionality of the gears 40. In one embodiment, the hinged mast sleeve housing 50, which secures the mast 20 in its inclined rotational state throughout the inclination maneuver, is a tubular structure of sufficient wall gauge and structural form to provide good material stiffness along the radial axis thereby allowing high elongation and compression resistance along said axis to minimize or eliminate any relative adjustment eccentricities in the mesh of the gears 40 caused by the periodic thrust loading from the rotor 10. The lower end of the sleeve 50 is hingeably attached to the floor 91 of the turret 90 by the hinge coupling 51 which allows the sleeve 50 to rotate relative to the floor 91 in a fixed axis which corresponds to the axis of inclination of the mast 20. The hinge coupling 51, being rigidly attached to the framework of the turret floor 91, precisely intercepts the plane of mesh of the gears 40 and serves to stabilize the pitch plane during inclination and to minimize end loading and radial thrusting of the mast 20. The shearing interface 52 of the rotating trunnion is a close-fitting abutment that exhibits frictional damping characteristics through the relative slip between the joint interface and the interface pressure between the contacting surfaces whereat vibration energy is transferred from the sleeve 50 to the turret floor 91 framework. The upper end of the sleeve 50 is configured as an abutment flange 53. The pulling load construction of the mast sleeve 50 is further illustrated in FIG. 8 where the internal coupling of the mast 20, which can incorporate a ribbed configuration, with the sleeve is shown. In this one possible embodiment, a generalized bearing layout is presented to illustrate the dynamic load-carrying capacity requirements to: 1) stabilize the lash of the gears 40; 2) resist any axial displacement of the mast 20; 3) compensate for radial loads imposed by inclination moments; and 4) restrict pulling tension loads imposed by the thrust of the rotor 10, as well as restrict compression loads exerted upon the rotor 10 by aerodynamic forces which also affect the axial stability of the mast 20. Angular contact ball bearings are designed for high speed conditions requiring rigid axial guidance. One option is to use a pair of double-row angular contact ball bearings 54 for radial guidance of the mast 20 and a double-acting angular contact thrust ball bearing 55 as an axial support of same mast. The sleeve 50 is the first of an arrangement of structures comprising the turret 90 designed to neutralize tension and compression loads imposed by flight dynamics on the mesh of the gears 40. In the DOVER paradigm, significant tension loads are removed from the mast 20. Due to the unfastened link between the gears 40, the in-flight mass of the aircraft is not supported by the transmission via the mast as in the prior art, but rather by the turret 90 (see "Azimuth Control Mechanism" section). Directed flight in the DOVER design by nature of the inclined mesh plane of the gears 40 can impose an asymmetrical axial and radial loading by the mast 20 gear 40 upon the transmission drive shaft 30 gear 40. One mitigating option for this anomaly is to impose a spatial rigidity to the drive shaft 30 and attached drive gear 40 thereby providing a stable template upon which the driven gear 40 may operate. In one embodiment, the drive shaft 30 can be mounted within the structural framework of the turret floor 91 whereat the shaft is supported by a pair of bearings 54 and a ribbed configuration provides additional axial stability (FIG. 9). Although the turret 90 is specially designed to mitigate inertial load moments originating from the attached fuselage (see "Azimuth Control Mechanism" section), the drive shaft 30 as an intergral component of the drive train will tend to transmit such loads to the driven mast 20. Also shown in FIG. 9 is a flexible gear coupling 56 of the prior art linked onto the drive shaft 30 between the floor 91 framework mount and the transmission 57 where the coupling serves to mitigate axial and radial load transfer from the drive train. Gear couplings allow the free transmission of torque while relatively small amounts of angular, parallel, and end float misalignment and displacement between modes is accomodated by a flexing action in the series of meshed splines. With this option, the transmission 57 would retain the flexible mounting with the aircraft engine(s) and fuselage that is standard in the prior art, while the turret-mounted shaft 30 section is spatially fixed to and integrated with the turret 90 load moment thereby creating a stable gear 40 mesh template. This divided input/output structural transition mode for increased output operational and functional form stability constituted in the ensconced drive shaft 30 is an embodiment of the DOVER. In one embodiment, the mast control sleeve 50 is rigidly attached at the abutment flange 53 to the thrust and vibration conductor 60 which embodies the point of leverage from where the mast 20 is moved through inclination (FIG. 10). The conductor 60, as shown in FIG. 11, is composed of a center form 61 encompassing a bearing 54 which is abutted and capped on top and bottom surfaces by end forms 62, each encompassing a bearing 54, although a single-row angular contact ball bearing also may suffice, with said end forms being separated from direct contact with the center form 61 by elastomeric isolators 63 in the form of washers that function as shock and vibration dampers for excitations emitted from the gears 40 which are absorbed by the bottom elastomer 63 and for aerodynamic loading and vibrations emitted from the rotor 10 which are absorbed by the top elastomer 63. The end forms 62 are attached to the center form 61 in an adjustable manner whereby a compressive force, implemented by means such as, but not limited to, mechanical fasteners, rotational locking details, or mating thread details formed between adjoining surfaces, secures the conductor 60 apparatus by way of a guide such as raceway grooves 64, whereat said conductor is firmly engaged with the transfer tracks 65 (FIG. 12). The transfer tracks 65, which are constituted in one embodiment by equably spaced bipolar configured ball transfer units, parallel the pitch line of the dome 92 of the turret 90. The inclination traverse space through which the conductor 60 passes via the tracks 65 is delineated by the inner facing surfaces of the bulkhead walls 66 that mirror the pitch diameter of the dome 92 and which are anchored at the upper edges onto said dome with said walls being integral to the longitudinal bulkhead 67 that extends along the arc of the dome fore and aft and onto which the transfer track units 65 are attached. On the outer opposing surfaces of the vertical walls 66 spanning the lower edges to the upper edges and angling diagonally to the horizontal edge of the longitudinal bulkhead 67 are the bulkhead buttresses 68, each situated opposite a ball unit 65 and serving to strengthen and stabilize the transfer tracks 65. The grand magnitude of vibration excitations relayed to the conductor 60 are transferred to the turret 90 framework via the longitudinal bulkhead 67 whereat said excitations conducted from the rotor 10 are primarily shunted to the upper ball of the units 65 and said excitations conducted from the gears 40 are primarily shunted to the lower ball of the units 65 whereby the total excitation load is then transduced along the bulkhead 67 and managed by the turret 90 damping system (see "Azimuth Control Mechanism" section). Other transfer unit configurations in lieu of balls may be used for conductor 60 conveyance such as, but not limited to, rollers. As another variation, rolling elements can be configured within the conductor 60 proper whereby said conductor can roll along a guided track. Also, a sliding abutment relationship between the conductor and inclination track is contemplated. The fundamental premise herein is an inertial fixation of modes between the conductor and the track. In one embodiment, the inclination maneuver is powered by a motor 70 (FIGS. 12 and 13) which powers a rack 71 and pinion 72 actuating system. The racks 71, being laid along the inclination traverse, are affixed to the inner faces of the vertical bulkhead walls 66, specifically onto a contiguous right-angle ledge 73 formed where said walls abut the transfer tracks 65 and which ledge runs the length of the inclination traverse. In one option, the motor 70 is secured to the aft locale of the top end form 62 of the conductor 60 so that, when activated, a torque is produced in the pinions 72 which subsequently are propelled up and down the curvilinear-configured racks 71 while positioning the conductor 60, mast 20, and rotor 10 along the traverse and concomitantly levering the sleeve 50 below. In this configuration, the pinions 72 are secured in mesh with the racks 71 by the same compressive force by which the conductor 60 is secured against the transfer tracks 65. This arrangement of structures whereby the variables of inclination moment execution, thrust load assimilation, and vibration redirection are managed by a single interactive mechanical system is an embodiment of the DOVER. The motor 70 is capable of swift, accurate, and incremental point-to-point control of a load. Specifically, the motor 70 is required to move a given load, stop it at a specified position, and hold it there until a subsequent motion command is initiated. The motor 70 also could be integrated into a rate damping response system capable of executing smooth, uniform moment reactions to possibly erratic command input as a means to preserve a stable lash dynamic between the gears 40. One option is a dc motor with a high-performance permanent magnet with low armature inductance and low rotor inertia combined with a velocity control feedback system that relays rate and angular position information to the cockpit. A linear mechanical actuator also is contemplated herein as a mechanism to power the inclination. Power and data transfer is relayed via the cable 74 that traverses the length of the mast control sleeve 50 along the hinge 51 to a circuit junction located on the turret floor 91, and into which other powered systems within the turret 90 structure are connected, whereat said junction tunnels the floor 91 to access the aircraft fuselage interior (not shown). In one embodiment, to shield the turret 90 interior from environmental contamination, an inclination traverse slide 80 can be employed to seal the traverse opening (FIG. 14). The slide 80, being rigidly attached at its center point to the conductor 60 upper surface, is configured as a strip forming a contrariwise octant from the center point and extending along and mirroring the curvilinear profile of the bulkhead 67. This design allows the traverse to be covered throughout the inclination maneuver: at 0° inclination the traverse is covered by the forward arc of the slide 80 and at 45° inclination the traverse is covered by the aft arc of the slide 80 as the slide moves in conjunction with the conductor 60 in this particular embodiment. An elastomer 81 is attached in a wraparound abutment to the specially configured projected ridge 82 of the bulkhead 67 which defines the contour of the upper perimeter of the traverse and whereat the attachment of the aircraft outer skin 83 serves to secure the elastomer in place (FIG. 15). A sliding seal is thus established by the compression of the elastomer 81 by the slide 80 against the ridge 82 whereat a slide track 84 is positioned to exert an upward pressure against the slide. The tracks 84, which traverse the total length of the path of the slide 80 along the bulkhead 67, can be adjustably attached to the vertical bulkhead walls 66, particularly in the region of the traverse, to allow the proper pressure to be maintained against the elastomer 81 along the length of the traverse and for the facilitation of inspection or replacement of the elastomer. In one embodiment, the tracks 84 may be screwed into the walls 66 by way of an elongated screw hole 85 that would permit the tracks 84 to be set with compressive force against the slide 80. The interface between the mast 20 and the slide 80 can be stoppered, in one embodiment, by a sealed sleeve bearing 86.

Figure 16:
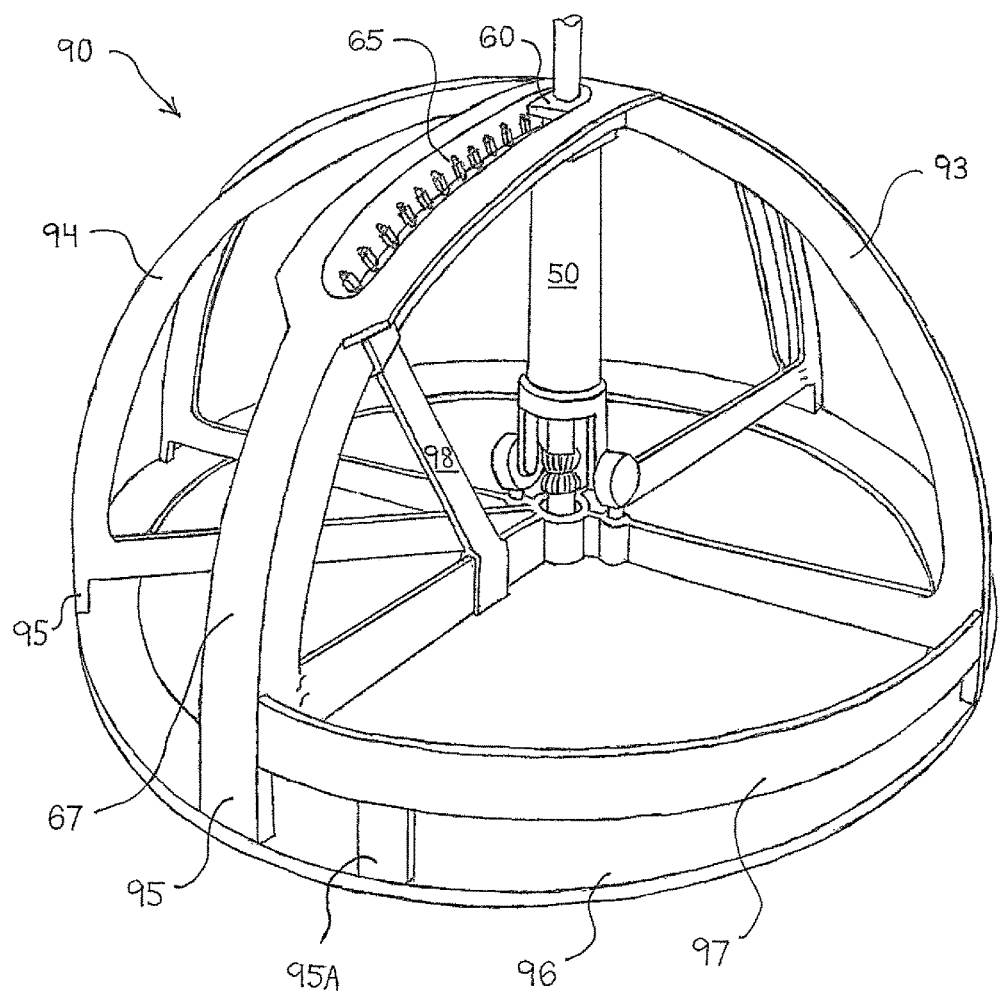
FIG. 16 is a cut away perspective view of the primary framework of the turret.
Figure 17:
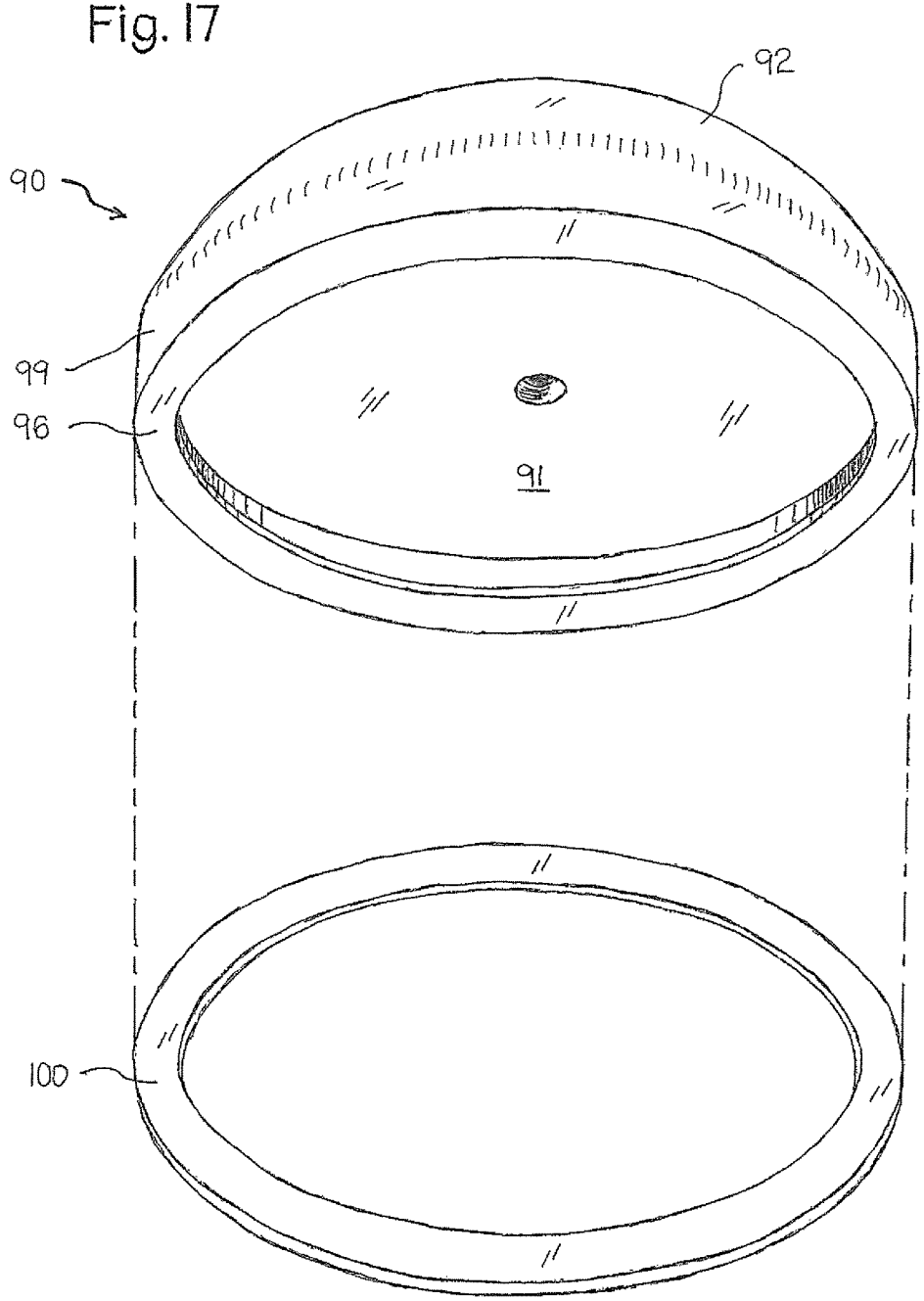
FIG. 17 is an exploded view showing the adjoining of the turret and fuselage.
Figure 18:
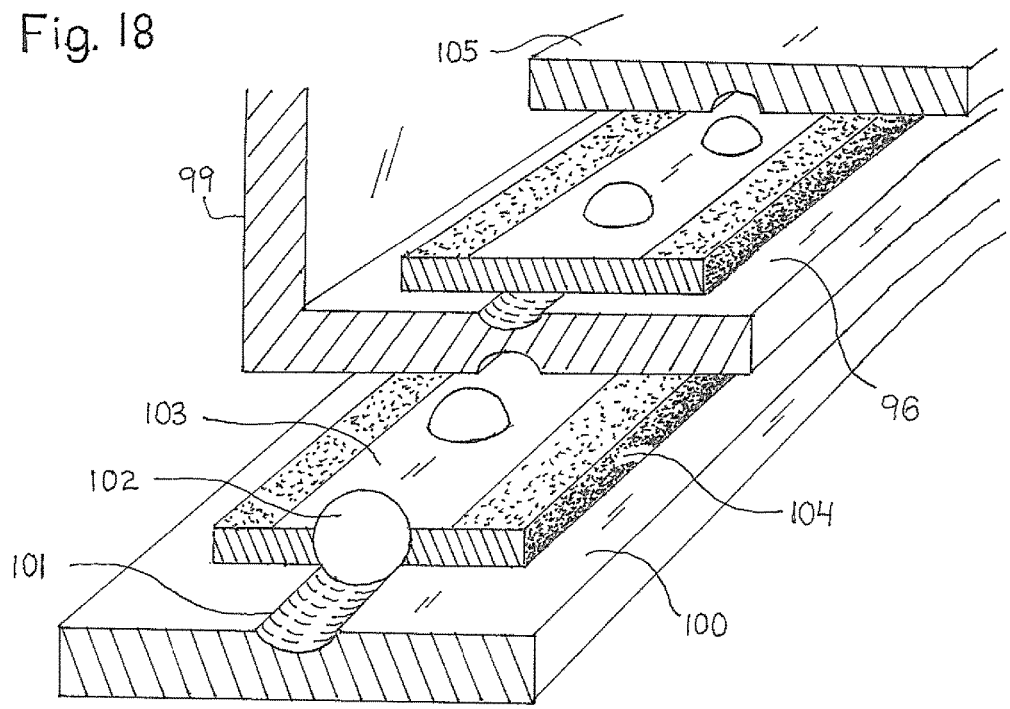
FIG. 18 is a cut away perspective view of the turret/fuselage ring interface unit.
Figure 19:
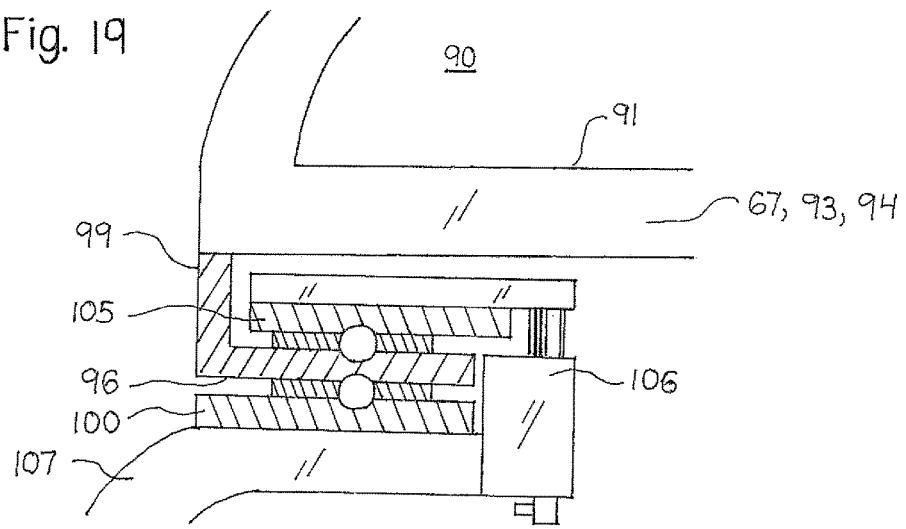
FIG. 19 is a cross-section view of the turret/fuselage ring interface unit.

Azimuth Control Mechanism:

In one embodiment, the azimuthal angular force imposed upon the gear 40 of the mast 20 is accomplished by the rotational action of the turret 90 with a structure constituted by a shell-like hemispherical dome 92 uniformly adjoined with a plate-like floor 91, with the two forms in unison designed to resist torsion and bending loads by the incorporation of internal stiffening members and which may be of reinforced shell, semimonocoque, or monocoque construction. As the principle housing component of the DOVER, the turret 90 is designed to withstand and transfer the force loads imposed by and upon the structural and mechanical components of the system, to direct and dissipate vibration energy, and to withstand the dynamic load of supporting the aircraft fuselage during all aspects of flight. Embodiments of the DOVER provide the turret 90 with a high rigidity of form and an efficient capacity for stress dissipation based on geometric configuration and material construction. One option is to begin with a skeletal framework that defines the outer shell while concurrently supporting the internal working mechanism. In FIG. 16, one possible interconnected design shows how the longitudinal bulkhead 67 engages the inclination power mechanism while the lateral bulkhead 93 supports the pivot point of the inclination mechanism as previously discussed, thus providing a combined mechanical operation and support structure. With this scheme, all internal (i.e., torque and thrust loading, gear 40 excitations) and external (i.e., aerodynamic loading on the rotor 10, inertial G forces) loads are channeled into the lattice of the frame where the loads can be mitigated. Further structural elements can be integrated in the form of diagonal bulkheads 94 radiating between the cross configuration of the bulkheads 67 and 93, bulkhead extension supports 95, being of high tension load resistance and extending from where the resultant bulkhead superstructure transitions from the turret dome 92 support to the turret floor 91 support and whereat said supports are rigidly connected to the outer edge of the planar ring 96 that interfaces with the fuselage. Extending circumferentially along the line where the dome 92 abuts the floor 91 is the horizontal bulkhead 97 which transfers load stresses between the support structures of the dome 92, the floor 91, and a circumferential spacing of more supports 95a about the structure. Other support structures can be incorporated within the framework of the turret 90 such as diagonal and vertical encastre beams 98 extending between the dome 92 and floor 91 for tension and compression loads, particularly in the vicinity of the inclination traverse which may be considered the flexural axis, and the addition of secondary curved array structures such as longerons and stringers for skin support which could be of a double-construction with multicell and/or sandwich configuration wherein the skin would be a major load-carrying member for structural efficiency (not shown). Such hull-supporting configurations can provide good vibration damping characteristics especially when incorporated with polymeric and organic materials with good absorption qualities. Auxiliary mass dampers integrated into the framework also are an option, particularly in the vicinity of the drive shaft 30. The finite element method of analysis is an appropriate technique of describing the mechanics of a complex and continuous structure such as the turret 90. The circular band configuration that constitutes the structure encompassing the extension supports 95 and 95a and the ring 96 functions as the turret base 99 which supports and maneuvers the turret proper against the aircraft fuselage foundation ring 100 upon which said base rests, whereat the planar ring 96 mirrors in form the foundation ring 100 (FIG. 17). The turret 90 with base 99 inclusive constitutes a rigid body wherein operational torsion and inertia loads are resisted by the airframe structure due to its strength and stiffness. The structures that couple the turret 90 with the aircraft fuselage exert supporting and reactionary forces on the two coupled bodies in response to those produced by the loads and the driving members. Therefore, the same standard of rigidity is continued into the aircraft fuselage foundation onto which the turret 90 is mounted. Any mechanical linkage arrangement between the turret 90 and the fuselage is required to withstand and function within the parameters of tension, compression, and torsion loads exerted between the two structural elements in the three dimensional paradigm of flight. In one embodiment of the DOVER, a mechanical linkage arrangement in the configuration of a double-acting thrust ball bearing is presented in FIG. 18. Channeling circumferentially along the two abutting planar surfaces of the rings 96 and 100 are raceway grooves 101 within which roll the elements 102 that ultimately transfer the predominate load forces between the turret 90 and the fuselage. One option is the use of polycarbonate rolling elements similar to those used in army tank turrets that absorb shock loads, prevent brinelling of the raceways, and are capable of withstanding great crushing loads. Metal and ceramic elements also are options. The rolling elements 102, which may be of the ball or roller type, are guided in a cage 103 that ensures uniform spacing and prevents mutual contact of the rolling elements. The outer edges of the cage 103 can perform as a lubricant seal by, as one possible arrangement, inserting a vulcanized strip of elastomer or felt 104 along the lengths and thereby inhibiting the egress of lubricant out of the raceway grooves 101. The upper face of the turret ring 96 also is abutted by a mirroring structure in the configuration of a detachable ring 105 whereat its function vis-à-vis the turret ring is conjunctive with that of the foundation ring 100, having a duplicated complement of raceway grooves 101, rolling elements 102, and cage 103. For installation and removal purposes, the detachable ring 105 can be configured in separate, joined segments. The mobile turret ring 96 is sandwiched between the foundation ring 100 and the detachable ring 105, both of which remain fixed, with the rolling elements 102 providing the dynamic transition linkage between the three-ring structures. Inertial G forces during flight manuevers impose a disjunctive relative motion force between separate structures within an aircraft body. In one embodiment, the proper dynamic association between the rings 96, 100, and 105 can be stabilized by a clamping network that exerts and maintains an optimal compressive force upon the detachable ring 105 and the foundation ring 100 with said optimal compressive force defined as one that maintains the configured integrity of the ring unit while maintaining a proper rolling pressure between the ring interfaces. In FIG. 19, this relationship is shown with clamping devices 106 which are distributed along the inner circumferential length of the mechanical linkage of the rings and, in one possible design, coincide with and are incorporated into a vertical frame structural element 107 of the aircraft fuselage. The clamping action of each devise 106 can be set manually and/or integrated into a network of interacting clamping actuators 106 powered hydraulically or electrically and controlled by the AFCS. In the case of AFCS control, any across-member elastic deformation of the ring unit due to inertial load pressure fluctuations during flight can be detected by motion sensors such as potentiometers (not shown) within the clamps 106 and immediately compensated for by an imposed reactionary and temporal increase of compressive force that preserves the working efficiency and physical integrity of the ring unit thereby permiting higher cornering velocities. The acceleration loads and associated strains attributed to lift which originate at the sleeve 50/conductor 60 linear vector and are transferred through the turret 90 framework ultimately are expressed at the ring unit juncture. In this embodiment of the DOVER, the pressure-adjusting turret ring unit performs the dual function of the principle aircraft support structure and turret rotation median during flight. The rotation action of the turret 90 is accomplished by the torque of a spur or transverse gear against an internal gear assembly thereby resulting in a torsion force against the turret. Turret traverse technology is a long instituted and developed prior art which is applicable to the DOVER and whose enumeration is beyond the scope of this application. In a manner similar to the inclination control motor 70, the azimuth control motor also relays rate and position data to the cockpit control system. Given a logistically unrestrained electrical source, the turret 90 would have the freedom to operate through a continuous, uninhibited 360° rotation regime. Slip ring or rotary electrical interface technology and similar systems that can be used in an electromechanical system where electrical power and command and response data can be transferred from a stationary to a rotation structure, and vice versa, is applicable to the DOVER. Structural support for such turret traverse and mobile electrical power transmission can be provided by appropriate platform foundation extensions of the fuselage frame structure 107 situated in close proximity to the fuselage-facing turret floor 91, whereat the adjoining of the turret traverse and electromechanical component parts that bridge the turret 90 and frame structure 107 can be actuated.

Figure 20:
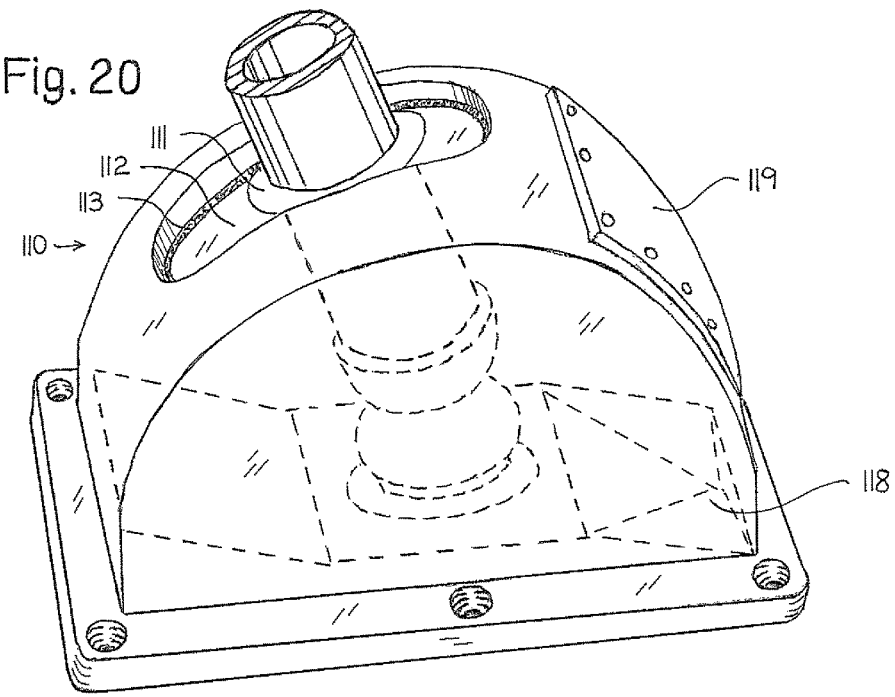
FIG. 20 is a perspective view of the gear lubrication housing.
Figure 21:
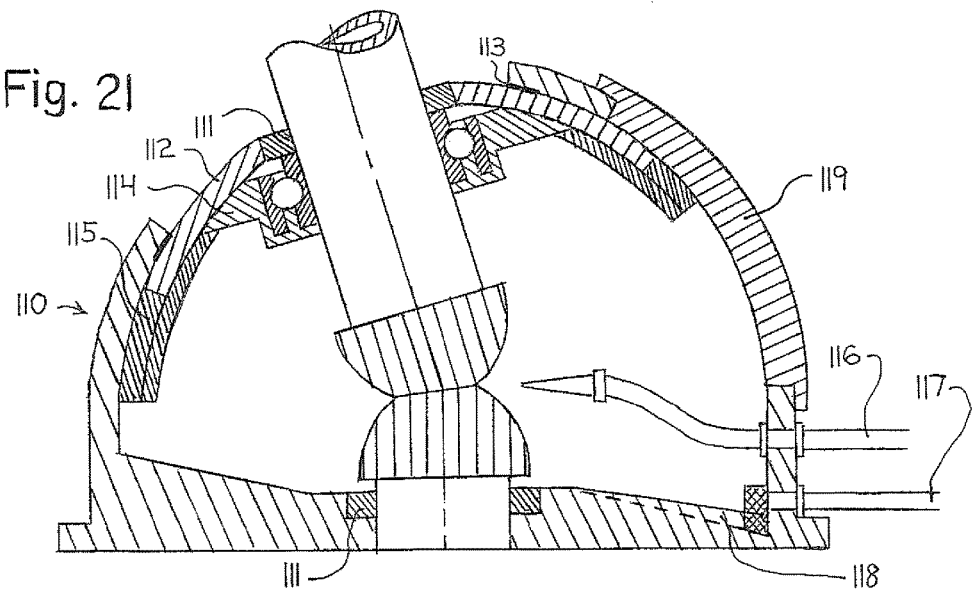
FIG. 21 is a side cut away view of the gear lubrication housing.

Gear Lubrication Housing:

High speed precision gear technology of the prior art generally requires a rigidity of the gearbox housing assembly for proper stability of the working gears. A lack of rigidity invariably increases the possibility of active vibrations causing shifting contact patterns on the tooth profiles during cyclic loading and unloading dynamics. This operational limitation is not applicable to the DOVER since the inclination motion of the mast 20 necessitates a motion-accomodating capability of the protective housing while methods and mechanisms to mitigate vibrations and gear misalignment have been elucidated throughout this application. The sliding action of gears can be completely accomodated with proper lubrication, including the rolling pivot and lateral swivel motions embodied in the DOVER. New lubricant formulations with a critical specific elastohydrodynamic film thickness and extreme pressure additive for the specialized gears 40 may be required. In FIGS. 20 and 21, a motion-adapted lubrication component for the gears 40 is presented in the simplified and generalized form of a housing 110 that envelopes the gears and retains the mist of lubricant that is injected into said housing by a standard electrical oil pump commonly used on aircraft and located within the interior of the turret 90 (not shown). In one embodiment, the lubricating housing 110 is constituted as a container mounted onto the turret floor 91 that retains a forward section with a curved configuration that mirrors the inclination traverse of the turret dome 92. The mast 20 and shaft 30 are ringed at their contact perimeters with the housing 110 by shaft radial seals 111 that seal the lubricant within the container. The curvilinear motion of the mast 20 within the housing 110 can be accomodated by a similar mechanism as the inclination traverse slide 80 described in the "Inclination Control Mechanism" section whereby the mast 20 is fitted with a housing slide 112 that rides the traverse arc of the mast along an oil-tight elastomer seal 113 set within the formed upper surface of the housing. A mounted bearing unit 114 with a flange attached to the underside of the slide 112 can be adjusted against the mast 20 to exert the appropriate pressure against the slide to maintain the oil-tight seal. The underside of the slide 112 can shear against an adjustable slide track 115 which main purpose is to define a precise, close-fitting sandwiched arc path within which the slide 112 and attached mast 20 lower end must traverse as a means to limit or eliminate any radial and axial displacement. With this configuration, a robustly constructed housing 110 can contribute to overall stability of the mast 20 including resistance to thrust loading from the rotor 10. Another option would be a pressure-adapted, oil-tight shift boot in lieu of a housing slide apparatus. In one embodiment, a spray or mist fitting 116 is attached to the aft side of the housing 110 and projects into the interior where lubricant is deposited directly onto the mesh area of the gears 40. As the lubricant pools into the bottom cavity of the housing 110, a filtered siphon nozzle 117 removes the lubricant from the housing via suction action at the same rate that it is sprayed into the housing and is subsequently returned to a lubricant reservoir constituent of the oil pump system (not shown). Abrasive wear of the gears 40 can be monitored by magnetic particle inspection and the examination of metal fragments that settle into the sump area 118 of the housing 110 through access to the interior via the removable aft interior access hatch 119. The evacuated gear-heated lubricant is cooled by the oil pump system before being returned to the working gear 40 component via the fitting 116. The housing 110 also can have a finned construction for more efficient heat dissipation. Although the complete lubrication system described herein consists of an assembly of individual units external to the housing 110, a system comprising an arrangement of units built into the housing 110 also is contemplated, in which case the aft section of the housing may be extended and enlarged as necessary to enclose said units thereby forming a self-contained system. The primary objective herein is to describe the function of a motion-adapted lubrication housing with a standard aircraft mist lubrication system. Heat exchange between the turret 90 interior and the ambient environment can be accomplished by vents and blower fans built into the turret structure (not shown). Other HVAC systems also are options. Access to the interior of the turret 90 can be made via a hatch integrated into an aft section of the dome 92 (not shown).

Variations:

Gearing is an efficient and reliable mechanism for the transmission of power and motion between rotating shafts in a uniform motion as reflected in the ball-face spline-tooth gear 40 presented in this application. An alternate method of force transference is contemplated herein in the form of the constant-velocity (CV) joint of the prior art that also allows a driven shaft to transmit force through a variable angle in a uniform motion. CV joints generally are sealed units with internal moving components that would preclude the implementation of general aeronautical regulations for the visual inspection of structures for soundness and wear, which could lead to catastrophic consequences for an airborne vehicle. Any use of such prior art in lieu of the preferred embodiment presented herein does not abrogate the general theme and methods of application implicit in the purpose and use of the DOVER and is therefore considered under the scope of the embodiments of the DOVER. Embodiments of the DOVER encompass multi-rotor aircraft as well as degrees of inclination ranges less than and greater than the representational 45° inclination range presented throughout this application. It also is declared herein that elements of the DOVER can be applied to fixed-wing aircraft and watercraft propeller technology and that such transference is within the scope of the DOVER, including push-thrust methodology which involves an inverted thrust vector.

Figure 22:
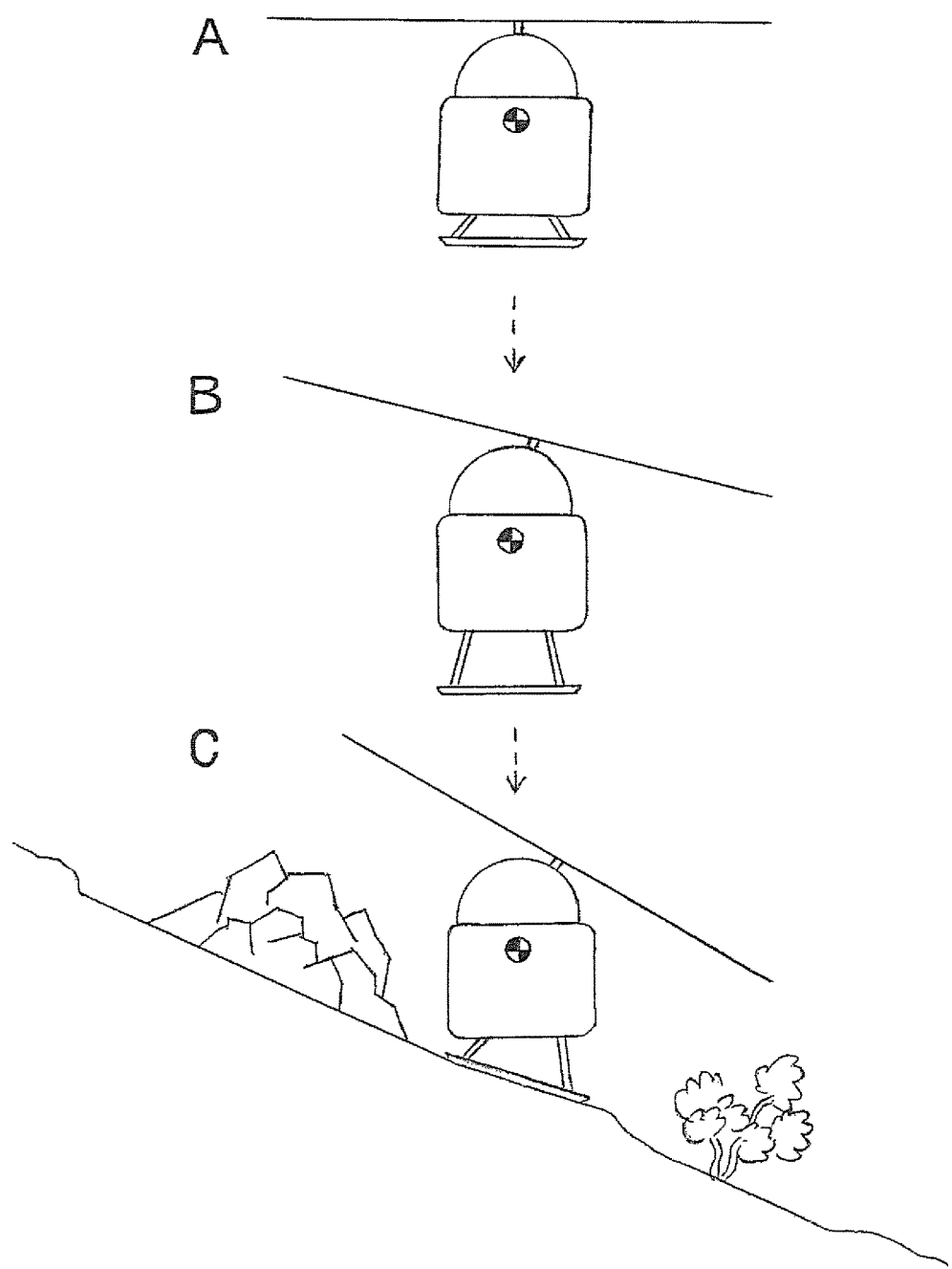
FIG. 22 is an illustration showing one possible slope landing sequence procedure using a DOVER- and VARSLAP-equipped helicopter.

Unique Performance Characteristics:

The implementation of the innovative design of the DOVER will necessarily require preliminary finite-modeling, field testing, and the formulation of new flight rules and procedures which would be beyond the scope of this application. However, the contemplation of certain notable inherent abilities of the DOVER concept is warranted. The helicopter of the prior art can be seen as a dynamic pendulum with the rotor directional control source (i.e., blade pitch) directed laterally across a rigidly attached mast above the center of gravity of the fuselage, an arrangement that inflicts an inherent dynamic instability in the aircraft when maneuvering or when affected by atmospheric perturbations resulting in an aerodynamic reaction often manifest in a longitudinal roll. Center of gravity variables are of upmost concern for helicopters of the prior art due to the restricted latitude for reactionary movement in the tip path plane to compensate for unbalanced vehicle dynamics. With embodiments of the DOVER by contrast, the rotor directional control source point of origin (i.e., the gear 40 mesh) is linearly projected from and in relatively close proximity to the center of gravity of the fuselage, an arrangement which allows for a more stable operating dynamic. In addition, given the free articulation about the fuselage mass by the rotor, a slewing action or motion is instituted within the flight dynamic that allows the fuselage to rotate tangentially around a turn while minimizing any roll about the longitudinal axis and thereby leading to a reduced angle of bank. Control also can be maintained when the aircraft is destabilized by gusts or strong sustained winds by simply directing the rotor vector towards the wind force during flight. As such, the DOVER may be regarded as an aerodynamic clutch that can ameliorate turbulence effects by an alignment of the thrust-force vector moment of the inertia mass with the imposed forced air movement. The greater compensatory range of motion inherent in the DOVER allows for a much larger range for error and enhanced safety. The DOVER can provide increased utility and safety margins for slope landings as well, particularly when equipped with a variable surface landing platform (VARSLAP) gear. Specifically, the VARSLAP would greatly diminish the inherent threat of dynamic rollover down a slope by maintaining a perpendicular center-of-gravity with the horizontal while the DOVER would decrease the danger of prop contact with the sloped terrain and associated obstacles. For example, when executing a lateral slope landing in a helicopter of the prior art, the accepted procedure entails pointing the tip path plane of the rotor (controlled by the cyclic) slightly upslope or into the hill in order to lock in the landing gear. Upon contact of the uphill skid, the power (controlled by the collective) is then reduced to allow the vehicle to settle. As the downhill skid is lowered, the tip path plane is kept deflected into the hillside in order to compensate for the tendency of the helicopter to slide or roll downhill as a result of the unbalanced center-of-gravity. Helicopters of the prior art are capable only of landing safely on slopes of modest inclination, and always with risk. In FIG. 22, an alternate slope landing method using a DOVER- and VARSLAP-equipped helicopter is presented. In FIG. 22*a*, the pilot has ascertained the slope is within safe landing parameters. In FIG. 22*b*, the pilot extends the VARSLAP gear, decreases the power or engine rpm, and inclines the rotor down slope or away from the hill to avoid prop contact with any upslope obstructions. Although a thrust vector perpendicular to the blade set is generated due to the inclination, a compensatory reduction in engine rpm can result in a de facto vertical descent. In FIG. 22*c*, the VARSLAP gear conforms to the slope of the terrain and the helicopter settles at gravitational horizontal.

What is claimed is:
1. A method of using a spherical coordinate system to control a rotor of a craft, said craft comprising a rotational turret having a dome profile, the method comprising:
 (a) specifying an inclination coordinate $\Delta\theta$;
 (b) specifying an azimuth coordinate $\Delta\psi$;
 (c) merging the inclination and azimuth coordinates into a position vector r, wherein said position vector is the point position of the rotor $P(r, \theta, \psi)$ with respect to the dome profile of the rotational turret in relation to the craft; and
 (d) moving the rotor along the dome profile according to the vector, wherein the inclination coordinate is set by an inclination mechanism, said inclination mechanism comprising a mast control sleeve, a thrust and vibration conductor, a transfer track, and an actuator, whereby the curvilinear action along an arc perimeter of the rotational turret mirrors and projects a ball profile of a mechanism for mobile torque application.

2. The method of claim 1, wherein the azimuth coordinate is set by an azimuthal control mechanism, said azimuthal control mechanism defining an azimuthal angular force imposed on a gear of a mast within said rotational turret.

3. The method of claim 1, wherein the position vector in relation to the craft determines the motion of the craft.

4. The method of claim 1, wherein the turret is attached to the craft, whereby said turret can rotate relative to said craft.

5. The method of claim 4, wherein the turret is secured to the craft by a compressive force imposing a rigid control surface rotation, whereby motion between said turret and said craft deviant from the rotational motion is minimized.

6. The method of claim 1, wherein the rotor is attached to a driven shaft and said shaft is attached to a drive shaft, whereby said drive shaft is positioned in an axis passing through the center of the plane of the turret/craft interface, and the inline position of the driven shaft relative to the drive shaft is designated as a first position of the rotor shaft.

7. The method of claim 6, wherein the first position of the rotor is designated as the 0° inclination shaft position and the turret/craft interface is designated as the azimuth, whereby said azimuth constitutes a plane perpendicular to the axis of the 0° shaft position, and whereat the turret revolves in relation to the craft along the perpendicular plane.

8. The method of claim 4, wherein the turret is moved from a first position along the azimuth relative to the craft to a second angled position along the azimuth relative to the craft.

9. The method of claim 7, wherein the rotor is moved in an inline path from the 0° position relative to the turret azimuth to an inclined position relative to the azimuth.

10. The method of claim 9, wherein the inline path is an inclination traverse configured into the dome profile of the turret.

11. The method of claim 10, wherein the rotor-attached end of the driven shaft is conveyed along the inclination traverse by a shaft conductor, whereby said conductor tracks said inclination traverse in an angled path relative to the turret azimuth, wherein the shaft rotates within the shaft conductor.

12. The method of claim 11, wherein the opposing end of the driven shaft is driven by a mechanism for mobile torque application, whereat said shaft end intersects the axis of the plane of the turret azimuth.

13. The method of claim 12, wherein the driven shaft is secured to the mechanism for mobile torque application by a mast control sleeve, whereat said sleeve is anchored to the floor of the turret, whereby said floor is planar to the azimuth and conveys the sleeve in sympathetic rotation, and whereby the opposing end of said sleeve is in contact with the shaft conductor or constitutes said conductor, wherein said shaft rotates within the shaft control sleeve.

14. The method of claim 13, wherein the mast control sleeve is hingeably attached to the turret floor, where at the shaft end passes through an initial side angle arc at the location of the mechanism for mobile torque application and the opposing shaft end passes through a terminal side angle arc at the location of the shaft conductor, whereby said shaft is levered in inclination and said mast control sleeve is a thrust conduit between the floor of the turret and the dome profile of the turret.

15. The method of claim 13, wherein a rotation of the turret along the azimuth directs the rotor along said azimuth relative to the craft at a plurality of incline positions set by the inclination mechanism, whereby the driven shaft in contact with the drive shaft is rotated along the azimuth relative to said drive shaft at the mechanism for mobile torque application at a plurality of incline positions set by the inclination mechanism.

16. The method of claim 15, wherein the inclination motion and azimuthal motion of the rotor when concurrent result in a summed motion, whereby said rotor travels in a diagonal traverse across the dome profile of the turret in relation to the craft.

17. The method of claim 16, wherein the mechanism for mobile torque application is activated at the axis of the plane of the turret azimuth, whereby the resultant inclination and torque actions of the driven shaft coincide with the azimuthal action of the turret, whereby the actions of torque, inclination, and azimuthal motion impose a synchronous mobile thrust vector congruent with the turret structure.

18. The method of claim 17, wherein the turret structure is a conductor for the thrust vector force generated by the rotor at a plurality of incline and azimuth positions set within said turret structure, whereby an inertial coupling load transfer from the turret to the craft at the azimuthal interface between said turret and said craft is extant from whence the craft is maneuvered by the rotor.

* * * * *